UNITED STATES PATENT OFFICE.

ABEL VERMEISTCH, OF LAWRENCE, MASSACHUSETTS, AND NOEL VERHULST, OF PAWTUCKET, RHODE ISLAND.

COMPOUND FOR USE IN PREPARING SIZING COMPOSITIONS.

956,551. Specification of Letters Patent. Patented May 3, 1910.

No Drawing. Application filed July 23, 1909. Serial No. 509,132.

*To all whom it may concern:*

Be it known that we, ABEL VERMEISTCH, a citizen of Belgium, residing at Lawrence, in the county of Essex and State of Massachusetts, and NOEL VERHULST, a citizen of France, residing at Pawtucket, in the county of Providence and State of Rhode Island, have invented certain new and useful Improvements in Compounds for Use in Preparing Sizing Compositions, of which the following is a specification.

Our invention is a composition of matter which is to be used in the preparation of warps for weaving textile materials. It is generally used for sizing warps in the machine which is known as a slasher. It can be applied to warps made of wool, cotton, silk or any other fiber or mixture of fibers.

Our composition consists of the following ingredients combined in the proportions stated: sulfate of copper 1.50 ounces, sodium borate (borax) 5.00 ounces, hydrous silicate of magnesia (talc) 9.75 ounces, wheat flour 9.75 ounces, water 250 gallons.

The sulfate of copper, borax, talc, and flour are first thoroughly mixed dry and are then thoroughly stirred into the water which has been brought up to the boiling point preferably in a steam jacketed or water jacketed boiler. The ingredients are then continuously stirred and boiled for about one hour.

In making the above named composition, it is desirable to use about five pounds of lard and fifty pounds of dry starch mixed with the composition. Or we may use from twenty five to fifty pounds of starch without lard. This composition is placed in the trough of the slasher or other warp preparing machine and the warp is passed through it in the usual manner while it is still hot. The excess of size is pressed out of the warp by the usual rolls and the warp is then dried in the usual manner.

By the use of the above composition the warp thread is made stronger and smoother. Moreover the ingredients are cheaper than any other composition used for the same purpose.

We are aware that some silicates of magnesia are used for sizing warps and that wheat flour is also so used but we believe that we are the first to use the composition described.

The above named proportions may be varied to some extent without departing from our invention, but we find the above named proportions are the best.

What we claim as our invention and desire to cover by Letters Patent, is:

1. The herein described composition of matter consisting of water, copper sulfate, sodium borate, hydrous silicate of magnesia, and flour substantially as described and for the purpose specified.

2. The herein described composition of matter for preparing warps for weaving consisting of water 250 gallons, copper sulfate 1½ ounces, sodium borate 5 ounces, hydrous silicate of magnesia 9¾ ounces, flour 9¾ ounces.

3. The herein described composition of matter consisting of copper sulfate, sodium borate, hydrous silicate of magnesia, and flour substantially as described and for the purpose specified.

In testimony whereof we hereto affix our signatures in the presence of two witnesses.

ABEL VERMEISTCH.
NOEL VERHULST.

Witnesses:
GEORGE MILLER,
GARDNER W. PEARSON.